(12) United States Patent
Zeng

(10) Patent No.: US 10,317,726 B2
(45) Date of Patent: Jun. 11, 2019

(54) BACKLIGHT MODULE AND LIQUID CRYSTAL DISPLAY DEVICE

(71) Applicant: Wuhan China Star Optoelectronics Technology Co., Ltd., Wuhan, Hubei (CN)

(72) Inventor: Jie Zeng, Hubei (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 238 days.

(21) Appl. No.: 14/778,228

(22) PCT Filed: Jun. 18, 2015

(86) PCT No.: PCT/CN2015/081806
§ 371 (c)(1),
(2) Date: Dec. 1, 2016

(87) PCT Pub. No.: WO2016/183894
PCT Pub. Date: Nov. 24, 2016

(65) Prior Publication Data
US 2018/0120635 A1    May 3, 2018

(30) Foreign Application Priority Data
May 21, 2015 (CN) .......................... 2015 1 0263233

(51) Int. Cl.
*G02F 1/1335* (2006.01)
*G02F 1/1333* (2006.01)
(52) U.S. Cl.
CPC .. *G02F 1/133602* (2013.01); *G02F 1/133308* (2013.01); *G02F 1/133615* (2013.01);
(Continued)

(58) Field of Classification Search
None
See application file for complete search history.

(56) References Cited

U.S. PATENT DOCUMENTS 9,110,204 B2 * 8/2015 Nakamura ........... G02B 6/0026
2011/0089809 A1 * 4/2011 Noh ....................... B82Y 20/00
313/483
(Continued)

FOREIGN PATENT DOCUMENTS

CN    102281341    12/2011
CN    102966884    3/2013
(Continued)

OTHER PUBLICATIONS

Search Report and Written Opinion, dated Feb. 25, 2016, for International Application No. PCT/CN2015/081805.
(Continued)

*Primary Examiner* — Elmito Breval
(74) *Attorney, Agent, or Firm* — Andrew C. Cheng

(57) ABSTRACT

A backlight module and a liquid crystal display device are disclosed. The backlight module comprises a frame, which comprises a first extension part and a second extension part that are parallel to each other, and a connection part that is connected between the first extension part and the second extension part, wherein a light source is arranged on an inner side of the connection part; and wherein a quantum tube that can receive light from the light source is provided between an inner end of the first extension part and an inner end of the second extension part. According to the present disclosure, the quantum tube can be supported by the backlight module firmly, so that the quantum tube can be used in the liquid crystal display device.

12 Claims, 2 Drawing Sheets

(52) U.S. Cl.
CPC ............ *G02F 2001/133614* (2013.01); *G02F 2202/36* (2013.01)

(56) References Cited

U.S. PATENT DOCUMENTS

| | | | | |
|---|---|---|---|---|
| 2012/0307518 | A1* | 12/2012 | Lee | G02F 1/133615 362/602 |
| 2013/0050612 | A1* | 2/2013 | Hur | G02F 1/133603 349/62 |
| 2014/0286049 | A1 | 9/2014 | Cha et al. | |
| 2015/0103291 | A1* | 4/2015 | Li | G02B 6/0023 349/62 |
| 2015/0226904 | A1* | 8/2015 | Bae | G02B 6/0023 362/608 |
| 2015/0234111 | A1* | 8/2015 | Lee | G02B 6/0023 362/608 |
| 2015/0355400 | A1* | 12/2015 | Li | G02F 1/133608 349/62 |
| 2015/0369993 | A1* | 12/2015 | Kim | G02B 6/009 362/610 |
| 2016/0018583 | A1* | 1/2016 | Lee | G02B 6/0088 362/601 |
| 2016/0070056 | A1* | 3/2016 | He | G02B 6/0091 349/65 |
| 2016/0238779 | A1* | 8/2016 | Li | G02B 6/0088 |
| 2016/0245975 | A1* | 8/2016 | Li | G02B 6/0088 |
| 2016/0306100 | A1* | 10/2016 | Chen | G02B 6/0026 |
| 2016/0341874 | A1* | 11/2016 | Fan | G02B 6/0091 |
| 2017/0003442 | A1* | 1/2017 | Chen | G02B 6/0088 |
| 2017/0102494 | A1* | 4/2017 | Que | G02B 6/0026 |

FOREIGN PATENT DOCUMENTS

| | | |
|---|---|---|
| CN | 103681990 | 3/2014 |
| CN | 103775923 | 5/2014 |
| CN | 103885243 | 6/2014 |
| CN | 204227219 | 3/2015 |
| CN | 104820311 | 8/2015 |
| DE | 102004044358 | 3/2006 |
| KR | 20130024152 | 3/2013 |

OTHER PUBLICATIONS

Office Action and Search Report, dated May 2, 2017, for Chinese Patent Application No. 201510263233.5.

* cited by examiner

BACKLIGHT MODULE AND LIQUID CRYSTAL DISPLAY DEVICE

CROSS REFERENCE TO RELATED APPLICATION

The present application claims benefit of Chinese patent application CN 201510263233.5, entitled "Backlight Module and Liquid Crystal Display Device" and filed on May 21, 2015, the entirety of which is incorporated herein by reference.

FIELD OF THE INVENTION

The present disclosure relates to the technical field of liquid crystal display, and particularly to a backlight module and a liquid crystal display device comprising the backlight module.

BACKGROUND OF THE INVENTION

Quantum dot is a new fluorescent material that can convert light emitted by a Light-Emitting Diode (LED) or other light source into light with a required color. For example, CdSe quantum dot with a diameter of 2 nm can emit blue light in visible spectrum, while CdSe quantum dot with a diameter of 10 nm can emit red light in visible spectrum. The emission spectrum of quantum dot has a centralized spectrum and a pure color. In general, quantum dot can be mixed with a suitable chemical material so as to form liquid. Then, the liquid can be packaged in a glass tube, so that a quantum tube that can emit fluorescence can be manufactured.

In the prior art, fluorescence that is generated by fluorescent powder generally serves as backlight. However, the color of the backlight is not pure, and thus the display quality of the display device is poor. Therefore, it is desirable to use the quantum tube as a backlight module of a liquid crystal display device.

SUMMARY OF THE INVENTION

With respect to the aforesaid technical problem, the present disclosure provides a backlight module. According to the present disclosure, a quantum tube can be supported by the backlight module firmly and thus can be used in a liquid crystal display device. The present disclosure further provides a liquid crystal display device comprising the backlight module.

According to a first aspect, the present disclosure provides a backlight module. The backlight module comprises a frame, which comprises a first extension part and a second extension part that are parallel to each other, and a connection part that is connected between the first extension part and the second extension part, wherein a light source is arranged on an inner side of the connection part; and wherein a quantum tube that can receive light from the light source is provided between an inner end of the first extension part and an inner end of the second extension part.

In the backlight module according to the present disclosure, the quantum tube is arranged in front of the light source. Therefore, the light that is emitted by the light source can illuminate the quantum tube. That is, the quantum tube can receive the light from the light source and then emit fluorescence with a required color. The fluorescence that is emitted by the quantum tube can illuminate an inner side of the backlight module. Thus, when the backlight module is used in a liquid crystal display device, the liquid crystal display device is actually illuminated by the quantum tube.

According to one embodiment, the light source and the quantum tube are arranged parallel to each other. In this case, all regions of the quantum tube can receive light in a uniform manner, and thus can emit fluorescence uniformly.

According to one embodiment, the backlight module further comprises a first barrier wall corresponding to the inner end of the first extension part and a second barrier wall corresponding to the inner end of the second extension part, wherein a first carrying region is formed between the inner end of the first extension part and the first barrier wall, and a second carrying region is formed between the inner end of the second extension part and the second barrier wall; and wherein two ends of the quantum tube are disposed in the first carrying region and the second carrying region respectively. The quantum tube is made of a glass tube and can be broken very easily. Therefore, through arranging the first carrying region and the second carrying region in the backlight module, and installing the two ends of the quantum tube in the two carrying regions, the quantum tube can be fixed and protected effectively, and can be prevented from sliding in the backlight module or even falling out from the backlight module. Moreover, since a distance between the quantum tube and the light source is determined by a length of the first extension part and a length of the second extension part, the first extension part and the second extension part can both be configured with a relatively small length so as to shorten the distance between the quantum tube and the light source. In this manner, not only the light-emitting efficiency of the quantum tube can be improved, but also the liquid crystal display device can be configured with a narrower frame.

According to one embodiment, a width of the first carrying region and a width of the second carrying region both are larger than or equal to a length of a non light-emitting region of a corresponding end of the quantum tube. In the prior art, the two ends of the quantum tube cannot emit light. In the structure according to the present disclosure, the non light-emitting regions of the quantum tube serve as the installing parts thereof. In this manner, the adverse influence of the non light-emitting regions of the quantum tube on the display quality of the liquid crystal display device can be avoided.

According to one embodiment, the backlight module further comprises a plurality of barrier walls that are arranged between the first barrier wall and the second barrier wall and are used for carrying the quantum tube, and the plurality of barrier walls are parallel to the first barrier wall or the second barrier wall. These additional barrier walls can also play the role of supporting the quantum tube. In large sized backlight module or liquid crystal display device, these additional barrier walls are necessary for reducing the load of the first barrier wall and the second barrier wall and improving the stability of the quantum tube. Moreover, these additional barrier walls can prevent the quantum tube from being broken in a middle part thereof.

According to one embodiment, the first barrier wall, the second barrier wall, and the frame are integrated into one piece. The assembling procedure of the backlight module can be greatly simplified through using the frame with this structure. In addition, a positional error between the first barrier wall and the second barrier wall generated by the assembling procedure can be avoided.

According to one embodiment, the backlight module further comprises a quantum tube supporter that extends from the first carrying region to the second carrying region, wherein the quantum tube is affixed to the quantum tube supporter. The quantum tube supporter can also play the roles of supporting and protecting the quantum tube, so that the quantum tube can be prevent from being broken in a middle part thereof.

According to one embodiment, a thickness of the quantum tube supporter is less than a height of the light source on the connection part. In this case, the light that is emitted by the light source cannot be shielded by the quantum tube supporter, and thus the light-emitting efficiency of the quantum tube can be improved.

According to one embodiment, the quantum tube supporter and the frame are integrated into one piece. The assembling procedure of the backlight module can also be greatly simplified with this arrangement.

According to a second aspect, the present disclosure further provides a liquid crystal display device. The liquid crystal display device comprises a light guide plate and the aforesaid backlight module, wherein the backlight module is arranged at an end of the light guide plate.

According to the present disclosure, "inner" refers to a direction facing an internal part of the liquid crystal display device, while "outer" refers to a direction facing an external part of the liquid crystal display device.

Compared with the prior art, the following advantages can be brought about according to the present disclosure. On the one hand, in the backlight module according to the present disclosure, the quantum tube is arranged in front of the light source. Therefore, the quantum tube can receive the light that is emitted by the light source and can emit fluorescence, whereby the inner side of the backlight module can be illuminated and thus the liquid crystal display device can be illuminated. In this manner, the display quality of the liquid crystal display device can be improved. On the other hand, according to the present disclosure, the quantum tube can be arranged in the backlight module by the frame firmly, and moreover, the frame of the liquid crystal display device can be configured relatively narrow.

BRIEF DESCRIPTION OF THE DRAWINGS

The present disclosure will be illustrated in detail hereinafter with reference to the embodiments and the drawings. In the drawings.

Figure 1:
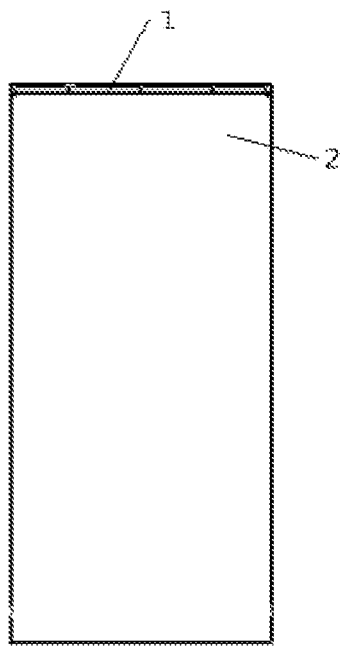
FIG. 1 schematically shows a position of a backlight module in a liquid crystal display device according to the present disclosure.

In the drawings, a same component is represented by a same reference sign. The drawings are not drawn according to actual scale.

DETAILED DESCRIPTION OF THE EMBODIMENTS

The present disclosure will be further illustrated hereinafter with reference to the drawings.

FIG. 1 schematically shows an internal structure of a liquid crystal display device according to the present disclosure, wherein a backlight module 1 is provided on an edge of the liquid crystal display device. In this case, the light that is emitted by the backlight module 1 can illuminate the whole liquid crystal display device under the action of other optical components of the liquid crystal display device, such as a light guide plate 2.

Figure 2:
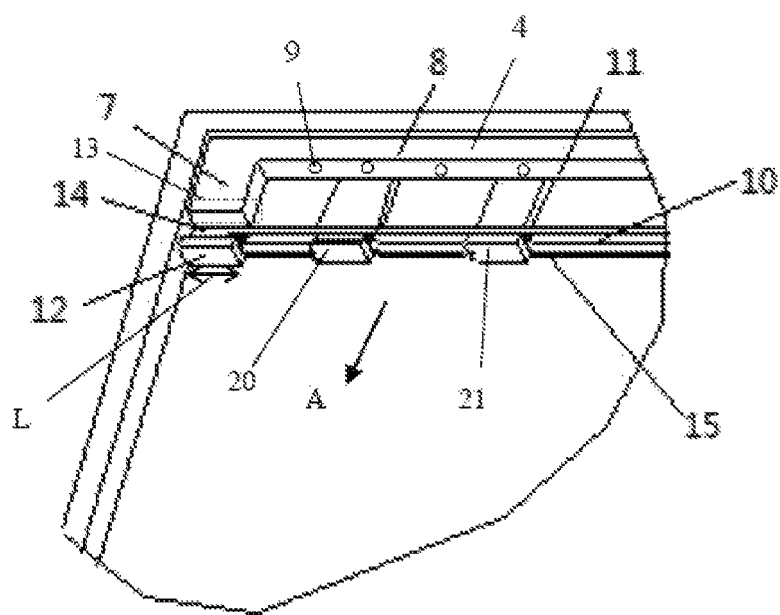
FIG. 2 is a three dimensional diagram showing a structure of the backlight module according to the present disclosure.
Figure 3:
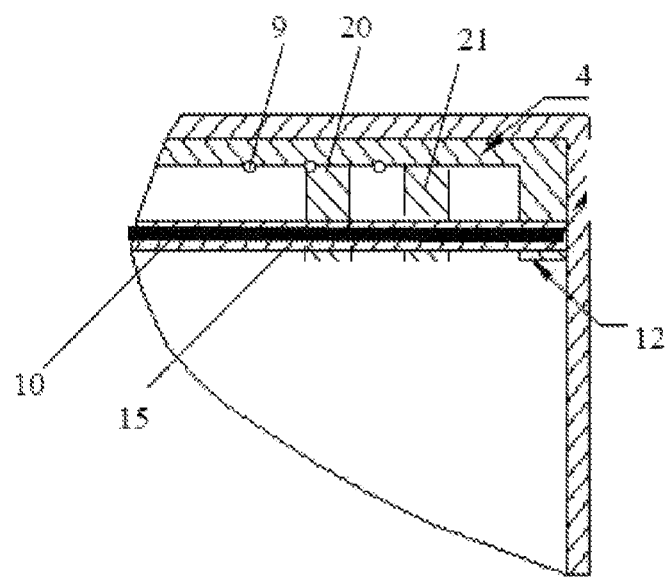
FIG. 3 is a two dimensional diagram showing the structure of the backlight module according to the present disclosure.

In order to improve the display quality of the liquid crystal display device, according to the present disclosure, a quantum tube serves as the backlight module 1. FIG. 2 and FIG. 3 schematically show a partial structure of the backlight module 1. As shown in FIG. 2 and FIG. 3, the backlight module 1 comprises a frame 4, and a light source 9 and a quantum tube 10 that are both assembled together with the frame 4.

As shown in FIG. 2, the frame 4 comprises a first extension part 7, a second extension part (not shown in FIG. 2) that extends in parallel with the first extension part 7, and a connection part 8 that is connected between the first extension part 7 and the second extension part. From a whole point of view, the frame 4 is a groove with an opening facing the inner side, wherein the first extension part 7 and the second extension part form sidewalls of the groove, and the connection part 8 forms a bottom surface of the groove. According to one embodiment, the first extension part 7, the second extension part, and the connection part 8 are integrated into one piece. Preferably, the first extension part 7 and the second extension part both are cuboids with a same length, and the connection part 8 is connected with an outer end of the first extension part 7 along a direction perpendicular to the first extension part 7. The second extension part has a shape the same as that of the first extension part 7, and is connected with the connection part 8 in a similar manner as that of the first extension part 7. The details of which are no longer repeated here.

The light source 9 is installed on an inner side 11 of the connection part 8, and the quantum tube 10 is installed in front of the light source 9 along a direction facing the inner side. In this case, the quantum tube 10 can receive the light that is emitted by the light source 9, and the light that is emitted by the quantum tube 10 still faces the inner side (a direction of an arrow A as shown in FIG. 2), i.e., an internal part of the liquid crystal display device. Therefore, the liquid crystal display device is actually illuminated by the light that is emitted by the quantum tube 10. The light source 9 can be a plurality of LEDs that are arranged on the connection part 8, or can be light source of other kinds.

In order to hold the quantum tube 10 in the backlight module 1 firmly, the backlight module 1 is provided with a first barrier wall 12 and a second barrier wall (not shown in FIG. 2). The first barrier wall 12 and an inner end 13 (as shown by dotted lines in FIG. 2) of the first extension part 7 are directly opposite to and spaced from each other, and the space forms a first carrying region 14. The positional relationship between the second barrier wall and the second extension part is arranged in a similar manner, and a second carrying region (not shown in FIG. 2) can be formed similarly. Two ends of the quantum tube 10 are disposed in the first carrying region 14 and the second carrying region respectively. In this manner, the quantum tube 10 can be prevented from moving in a direction perpendicular to an axial direction thereof by the first carrying region 14 and the second carrying region, so that the stability of the quantum tube 10 can be improved. In order to further improve the stability of the quantum tube 10, the two ends of the quantum tube 10 can be bonded to the first carrying region 14 and the second carrying region respectively. Moreover, it is surprisingly discovered that, a distance between the quantum tube 10 and the light source 9 can be reduced through configuring the first extension part 7 and the second extension part with a small length. In this manner, not only the light-emitting efficiency of the quantum tube 10 can be improved, but also a width of the backlight module 1 can be reduced, so that the liquid crystal display device with a narrower frame can be manufactured.

A width L of the first carrying region 14 and a width of the second carrying region both are configured larger than or equal to a length of a non light-emitting region of a corresponding end of the quantum tube 10. That is, the non light-emitting regions at the two ends of the quantum tube 10 each are completely shielded by the first barrier wall 12 or the second barrier wall, so that the adverse influence of the non light-emitting regions of the quantum tube on the display quality of the liquid crystal display device can be avoided. Preferably, in order to utilize the quantum tube 10 more effectively, the width L of the first carrying region 14 and the width of the second carrying region both are configured equal to the length of the non light-emitting region of the corresponding end of the quantum tube 10. In this manner, the non light-emitting regions of the quantum tube 10 can exactly serve as the installing parts thereof, and thus the light that is emitted by the quantum tube 10 can be utilized fully.

Preferably, the backlight module 1 can further comprise a plurality of barrier walls 20 and 21 that are arranged between the first barrier wall 12 and the second barrier wall. These barrier walls 20 and 21 are also used for carrying the quantum tube 10. In large sized liquid crystal display device, the quantum tube 10 generally has a large length and a large weight. In this case, the barrier walls 20 and 21 can effectively reduce the pressure of the first barrier wall 12 and the second barrier wall, and can prevent the quantum tube 10 from being broken in a middle part thereof. It can be understood that, the widths of the barrier walls 20 and 21 should be selected as small as possible, so that the light that is emitted by the quantum tube 10 would not be shielded by the barrier walls 20 and 21.

It can be understood that, the first barrier wall 12, the second barrier wall, and the frame 4 are integrated into one piece, and the barrier walls 20 and 21 as well as the frame 4 are also integrated into one piece. In this manner, the assembling of the backlight module 1 can be simplified.

As shown in FIG. 2 and FIG. 3, the backlight module 1 can further comprise a quantum tube supporter 15 that extends from the first carrying region 14 to the second carrying region, wherein the quantum tube 10 is affixed to the quantum tube supporter 15. In this case, a thickness of the quantum tube supporter 15 is less than a height of the light source 9 on the connection part 8, so that the light from the light source 9 would not be shielded. The quantum tube 10 can be supported and stabilized by the quantum tube supporter 15 in a direction perpendicular to an action direction of the first barrier wall 12 and the second barrier wall, and the details of which are no longer repeated here. Preferably, the quantum tube supporter 15 and the frame 4 are integrated into one piece.

The present disclosure is illustrated in detail in combination with preferred embodiments hereinabove, but it can be understood that the embodiments disclosed herein can be improved or substituted without departing from the protection scope of the present disclosure. In particular, as long as there are no structural conflicts, the technical features disclosed in each and every embodiment of the present disclosure can be combined with one another in any way, and the combined features formed thereby are within the protection scope of the present disclosure. The present disclosure is not limited by the specific embodiments disclosed herein, but includes all technical solutions falling into the protection scope of the claims.

The invention claimed is:

1. A backlight module, comprising a frame, which comprises a first extension part, and a connection part that is connected to the first extension part,
   wherein a light source is arranged on an inner side of the connection part; and
   wherein a quantum tube that can receive light from the light source is provided on an inner end of the first extension part,
   wherein the backlight module comprises a first barrier wall corresponding to the inner end of the first extension part,
   wherein a first carrying region is formed between the inner end of the first extension part and the first barrier wall;
   wherein one end of the quantum tube is disposed in the first carrying region.

2. The backlight module according to claim 1, wherein a width of the first carrying region is larger than or equal to a length of a non light-emitting region of a corresponding end of the quantum tube.

3. The backlight module according to claim 1, further comprising a plurality of barrier walls that are used for carrying the quantum tube, the plurality of barrier walls being parallel to the first barrier wall.

4. The backlight module according to claim 3, wherein the first barrier wall and the frame are integrated into one piece.

5. The backlight module according to claim 3, further comprising a quantum tube supporter that extends from the first carrying region, wherein the quantum tube is affixed to the quantum tube supporter.

6. The backlight module according to claim 5, wherein the quantum tube supporter and the frame are integrated into one piece.

7. The backlight module according to claim 1, wherein the first barrier wall and the frame are integrated into one piece.

8. The backlight module according to claim 1, further comprising a quantum tube supporter that extends from the first carrying region, wherein the quantum tube is affixed to the quantum tube supporter.

9. The backlight module according to claim 8, wherein a thickness of the quantum tube supporter is less than a height of the light source on the connection part.

10. The backlight module according to claim 8, wherein the quantum tube supporter and the frame are integrated into one piece.

11. The backlight module according to claim 1, wherein the light source and the quantum tube are arranged parallel to each other.

12. A liquid crystal display device, comprising a light guide plate and a backlight module,
   wherein the backlight module comprises a frame, which comprises a first extension part, and a connection part that is connected to the first extension part,
       wherein a light source is arranged on an inner side of the connection part; and
       wherein a quantum tube that can receive light from the light source is provided on an inner end of the first extension part; and
   wherein the backlight module comprises a first barrier wall corresponding to the inner end of the first extension part,
   wherein a first carrying region is formed between the inner end of the first extension part and the first barrier wall;
   wherein one end of the quantum tube is disposed in the first carrying region, wherein the backlight module is arranged at an end of the light guide plate.

\* \* \* \* \*